United States Patent
Bucci et al.

(10) Patent No.: US 7,986,126 B1
(45) Date of Patent: Jul. 26, 2011

(54) AUTOMATED SYSTEM FOR DETERMINING WHETHER VEHICLE CHARGE STATION IS PUBLICLY ACCESSIBLE

(75) Inventors: Jonathan P. Bucci, Redondo Beach, CA (US); James T. Pisz, Huntington Beach, CA (US); Brian H. Inouye, Rancho Palos Verdes, CA (US)

(73) Assignee: Toyota Motor Sales, U.S.A., Inc., Torrance, CA (US)

( * ) Notice: Subject to any disclaimer, the term of this patent is extended or adjusted under 35 U.S.C. 154(b) by 0 days.

(21) Appl. No.: 13/031,000

(22) Filed: Feb. 18, 2011

Related U.S. Application Data

(60) Provisional application No. 61/388,799, filed on Oct. 1, 2010.

(51) Int. Cl.
*H01M 10/46* (2006.01)
(52) U.S. Cl. ........................................................ 320/109
(58) Field of Classification Search ............... 320/101, 320/103, 104, 107, 109, 111; 180/65.21, 180/65.29; 235/381, 384; 340/905, 988, 340/993, 995.14, 995.19, 995.24, 438, 439, 340/455, 686.6, 5.9, 5.92; 455/414.1, 414.2, 455/414.3, 456.1, 456.2, 456.4, 456.6, 457; 701/22–26, 29, 123, 200, 201, 207, 209–213; 705/1.1, 8, 26, 27, 34, 412; 707/E17.005, 707/E17.01, E17.109; 709/217, 219
See application file for complete search history.

(56) References Cited

U.S. PATENT DOCUMENTS

| | | | |
|---|---|---|---|
| 5,499,181 A | 3/1996 | Smith | |
| 5,742,229 A | 4/1998 | Smith | |
| 5,790,976 A | 8/1998 | Boll et al. | |
| 6,185,501 B1 | 2/2001 | Smith et al. | |
| 6,434,479 B1 | 8/2002 | Kondou et al. | |
| 6,523,744 B2 | 2/2003 | Royal, Jr. et al. | |
| 6,941,197 B1 | 9/2005 | Murakami et al. | |
| 7,582,979 B2 | 9/2009 | Oyobe et al. | |
| 7,791,503 B2 | 9/2010 | Breed et al. | |
| 7,849,944 B2 | 12/2010 | DeVault | |
| 7,869,576 B1 | 1/2011 | Rodkey et al. | |
| 2008/0258682 A1* | 10/2008 | Li | 320/109 |

(Continued)

FOREIGN PATENT DOCUMENTS

EP    2263095 A2    12/2010

(Continued)

OTHER PUBLICATIONS

Anon. 2009. ODOT Issues First-in-Nation Request for Electric Vehicle Charging Equipment. Asian Reporter, Portland, OR, Apr. 14, 2009. p. 11.

(Continued)

*Primary Examiner* — Edward Tso
(74) *Attorney, Agent, or Firm* — McDermott Will & Emery LLP

(57) ABSTRACT

A system may automatically identify whether a vehicle charge station is publicly accessible. A location data input may receive location data which is indicative of the location of the vehicle charge station. A public accessibility data input may receive accessibility data which is relevant to determining whether the vehicle charge station is publicly accessible. A computer data processing system may determine whether the vehicle charge station is publicly accessible based on the accessibility data. A data output may deliver output data indicative of whether the vehicle charge station is publicly accessible based on the determination of such public accessibility by the computer data processing system.

20 Claims, 4 Drawing Sheets

U.S. PATENT DOCUMENTS

| | | |
|---|---|---|
| 2009/0005982 A1 | 1/2009 | Yu |
| 2009/0082957 A1 | 3/2009 | Agassi et al. |
| 2009/0157289 A1 | 6/2009 | Graessley |
| 2010/0065627 A1 | 3/2010 | Outwater |
| 2010/0094496 A1* | 4/2010 | Hershkovitz et al. ............ 701/22 |
| 2010/0114478 A1 | 5/2010 | Bai |
| 2010/0148981 A1 | 6/2010 | Isaacson |
| 2010/0198814 A1 | 8/2010 | Petersen et al. |
| 2010/0207588 A1 | 8/2010 | Lowenthal et al. |
| 2010/0237985 A1 | 9/2010 | Landau-Holdsworth et al. |
| 2010/0245124 A1 | 9/2010 | Bai et al. |
| 2010/0280678 A1 | 11/2010 | Tate, Jr. et al. |
| 2010/0280700 A1 | 11/2010 | Morgal et al. |
| 2010/0283426 A1 | 11/2010 | Redmann |
| 2010/0289451 A1 | 11/2010 | Tuffner et al. |
| 2010/0301810 A1 | 12/2010 | Biondo et al. |
| 2011/0010043 A1 | 1/2011 | Lafky |

FOREIGN PATENT DOCUMENTS

| | | |
|---|---|---|
| EP | 2264401 A1 | 12/2010 |
| WO | 2008042770 A2 | 4/2008 |
| WO | 2009126622 A2 | 10/2009 |
| WO | 2010096502 A1 | 8/2010 |

OTHER PUBLICATIONS

Anon. 2011. New MyFord Mobile App Keeps Focus Electric Owner Engaged and in Control of Electric Car Experience. PR Newswire, New York, Jan. 7, 2011, 3 pages.

Backenberg, C. 2010. The Quest for a Unified Location Database. May 10, 2010. TheWhereBusiness.com. 3 pages. (Downloaded from http://itunes.apple.com/us/app/chargepoint/id356866743# Feb. 20, 2011).

Coulomb Technologies, Inc. 2010. ChargePoint by Coulomb Technologies, Inc. iTunes Preview (iPhone App), updated Apr. 22, 2010. 3 pages. (Downloaded from http://news.thewherebusiness.com/content/quest-unified-location-database Feb. 20, 2011).

Darwin 3D, LLC. 2011. EV Charger Finder. iTunes Preview (iPhone App), updated Feb. 5, 2011. 2 pages. (Downloaded from http://itunes.apple.com/us/app/ev-charger-finder/id354628084?mt=8# Feb. 20, 2011).

Donikian, S. 1997. VUEMS: A Virtual Urban Environment Modeling System. In CGI '97 Proceedings of the 1997 Conference on Computer Graphics International, IEEE Computer Society, Washington DC, pp. 84-92.

Donikian, S. 1997. Multilevel Modeling of Virtual Urban Environments for Behavioural Animation. In CGI '97 Proceedings of the 1997 Conference on Computer Graphics International, IEEE Computer Society, Washington, DC, pp. 127-133.

Hyatt, V.M. 2011. Early Boost for Electric Cars Sought. McClatchy-Tribune Business News, Washington, 2 pages.

Midlam-Mohler, S. et al. 2009. PHEV Fleet Data Collection and Analysis. Vehicle Power and Propulsion Conference, 2009. VPPC '09. IEEE, Sep. 7-10, 2009, pp. 1205-1210.

Monteiro, V. et al. 2010. iV2G Charging Platform. Proceedings of the 13th International IEEE Annual Conference on Intelligent Transportation Systems, Medeira Island, Portugal, Sep. 19-22, 2010, pp. 409-414.

Munteanu, D-P. et al. 2008. Zone Profile Generation for Location Based Services and Traffic Analysis. Proceedings of the 12th WSEAS International Conference on Communications, Heraklion, Greece, Jul. 23-25, 2008, pp. 386-390.

Wang, Y-W. et al. 2009. Locating Road-Vehicle Refueling Stations. Transportation Research Part E 45, Elsevier, pp. 821-829.

* cited by examiner

AUTOMATED SYSTEM FOR DETERMINING WHETHER VEHICLE CHARGE STATION IS PUBLICLY ACCESSIBLE

CROSS-REFERENCE TO RELATED APPLICATION[S]

This application is based upon and claims priority to U.S. provisional patent application 61/388,799, entitled "Automated System for Indexing Electric Vehicle Charge Stations," filed Oct. 1, 2010, the entire content of which is incorporated herein by reference.

BACKGROUND

1. Technical Field

This disclosure relates to electric vehicles and to electric vehicle charge stations.

2. Description of Related Art

Batteries in electric vehicles need to be recharged after use. Stations which recharge these batteries are rapidly being installed. Some are accessible to the public; others are not.

Drivers of electric vehicles need to know the locations of nearby vehicle charge stations which are publicly accessible. Databases are being created to help keep track of this information. However, it may be difficult for these databases to keep current in view of the rapid pace at which new vehicle charge stations are being built.

Vehicle can be designed to automatically report the location of a vehicle charge station to a central database when they are being charged at the vehicle charge station. An example of technology which can facilitate such reporting is described in U.S. provisional patent application 61/388,799, entitled "Automated System for Indexing Electric Vehicle Charge Stations," filed Oct. 1, 2010, the entire content of which is incorporated herein by reference. However, this automated approach can result in a database which does not distinguish between vehicle charge stations which are public and those which are not. Containing such a mixture of information can significantly reduce the utility of such a database.

SUMMARY

A system may automatically identify whether a vehicle charge station is publicly accessible. A location data input may receive location data which is indicative of the location of the vehicle charge station. A public accessibility data input may receive accessibility data which is relevant to determining whether the vehicle charge station is publicly accessible. A computer data processing system may determine whether the vehicle charge station is publicly accessible based on the accessibility data. A data output may deliver output data indicative of whether the vehicle charge station is publicly accessible based on the determination of such public accessibility by the computer data processing system.

The accessibility data which is relevant to determining whether the vehicle charge station is publicly accessible may includes area data (including zoning data) indicative of whether the vehicle charge station is in a residential, commercial, or industrial area; establishment data indicative of whether the vehicle charge station is near or within a commercial, industrial or residential building; voltage data indicative of a voltage level of an electric charge delivered by the vehicle charge station to the vehicle; historic usage data indicative of when the vehicle was charged by the vehicle charge station on different occasions; time data indicative of a time of day at which the vehicle charge station delivered a charge to the vehicle; day-of-week data indicative of the day of a week on which the vehicle charge station delivered a charge to the vehicle; image data indicative of at least one image of the vehicle charge station; and/or ownership data indicative of the address of the owner of the vehicle. The computer data processing system may determine whether the vehicle charge station is publicly accessible based at least in part on the area data, establishment data, voltage data, historic usage data, time data, day-of-week data, image data, and/or ownership data.

A data query system may deliver a query to a database for the area data, establishment data, voltage data, historic usage data, time data, day-of-week data, image data, and/or ownership data. The location data input may receive the results of this a query.

A vehicle may contain the location data input, the public accessibility data input, the computer data processing system, and the data output. The location data may be provided by the vehicle.

A location detection system within the vehicle may detect the location of the vehicle and provide this detected vehicle location to the location data input as the location data which is indicative of the location of the vehicle charge station when the vehicle is being charged by the vehicle charge station. A wireless communication system in the vehicle may wirelessly transmit the location data which is indicative of the location of the vehicle charge station to a database system for indexing charge stations which is configured to aggregate location data from multiple vehicles. The wireless communication system may wirelessly transmit the location data to the database system for indexing charge stations if and only if the output data indicates that the vehicle charge station is publicly accessible.

A voltage detector in the vehicle may measure the voltage of a charge delivered to the vehicle by the vehicle charge station. The accessibility data which is relevant to determining whether the vehicle charge station is publicly accessible may include the voltage measured by the voltage detector.

A database system for indexing charge stations may contain the location data input, the public accessibility data input, the computer data processing system, and the data output. The location data input may receive location data indicative of the location of vehicle charge stations from multiple vehicles. The database system for indexing vehicle charge stations may receive multiple queries, each seeking the location of at least one publicly accessible vehicle charge station which is near a location which is part of the query and, in response to each query, provide the at least one location.

The database system for indexing charge stations may distinguish between vehicle charge stations which have been determined to be publicly accessible and vehicle charge stations which have been determined not to be publicly accessible by the computer data processing system.

Non-transitory, tangible computer-readable media may contain a program of computer-readable instructions which, when executed by a computer system, causes the computer system to implement one or more of the functions of the electric vehicle and/or the database system for indexing vehicle charge stations, as described above:

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details which may be apparent or unnecessary may be omitted to save space or for a more effective presentation. Some embodiments may be practiced with additional components or steps and/or without all of the components or steps which are described.

Figure 1:
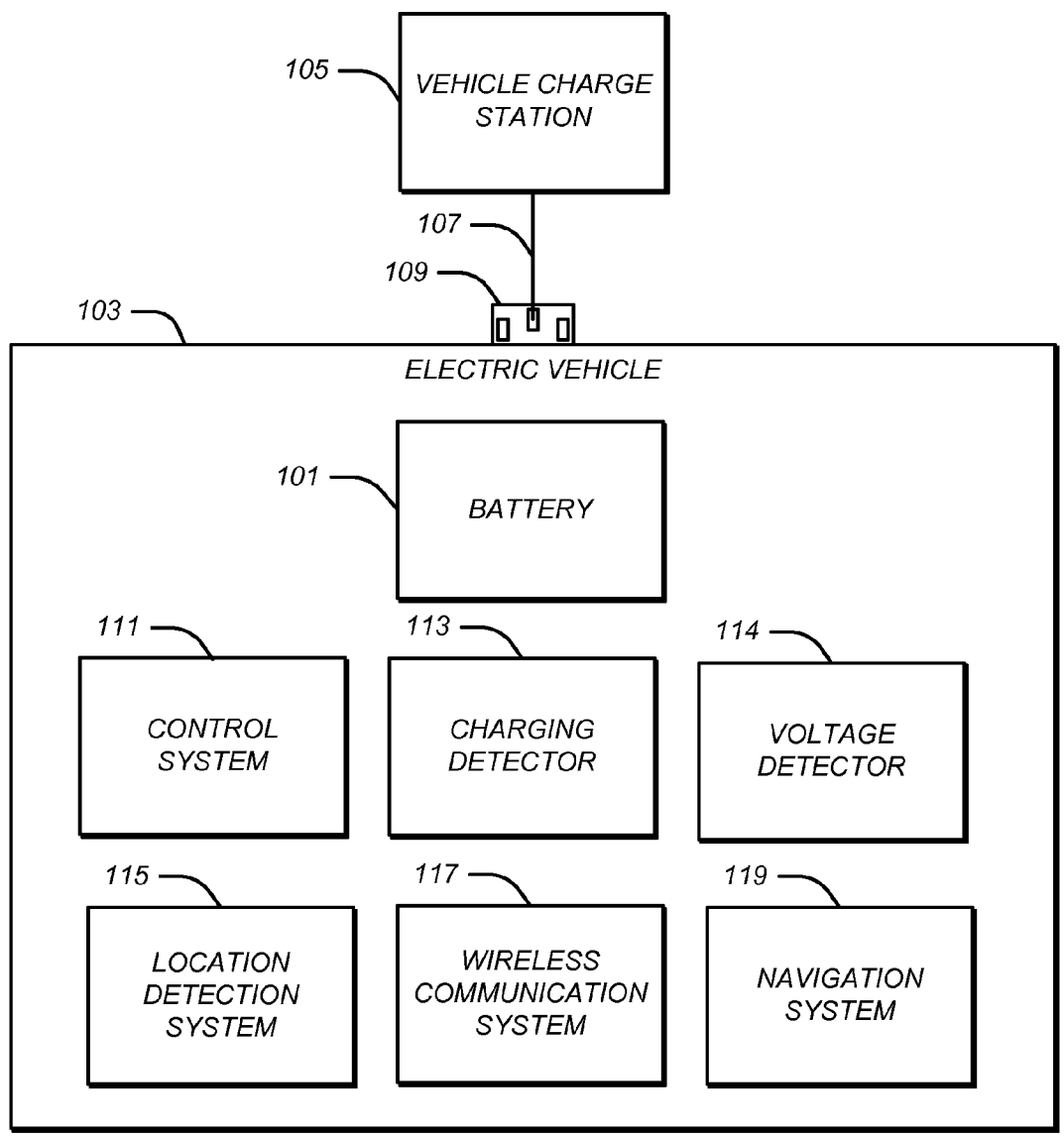
FIG. 1 illustrates an example of a battery of an electric vehicle being recharged at a vehicle charge station.

FIG. 1 illustrates an example of a battery 101 of an electric vehicle 103 being recharged at a vehicle charge station 105. The charging may take place through a charging cable 107 which has been plugged into a connector 109 on the electric vehicle 103.

The electric vehicle 103 may be of any type. For example, the electric vehicle 103 may be an automobile or a motorcycle configured to propel itself with electrical energy stored in the battery 101.

A control system 111 may be configured to monitor and control the recharging. The control system 111 may be of any type. For example, the control system 111 may be part of a Data Control Module within the electric vehicle 103 and may be configured to perform other functions in the electric vehicle 103. The electric vehicle 103 may include a charging detector 113. The charging detector 113 may be configured to detect when the battery 101 is being recharged by the vehicle charge station 105. The charging detector 113 may be of any type. For example, the charging detector 113 may consist of or include a mechanical switch configured to close when a plug is plugged into the connector 109 on the electric vehicle 103. The charging detector 113 may in addition or instead consist of or include a current and/or voltage sensor configured to sense when recharging current is flowing into and/or a recharging voltage is applied across the battery 101. The electric vehicle may include a voltage detector 114. The voltage detector may be configured to measure the voltage of a charge delivered to the battery 101 by the vehicle charge station 105.

The electric vehicle 103 may include a location detection system 115. The location detection system 115 may be configured to detect the location of the electric vehicle 103, such as its latitude and longitude. The location detection system 115 may be of any type. For example, the location detection system 115 may consist of or include a GPS receiver. It may in addition or instead utilize cell phone triangulation technology. In lieu of or in addition to the location detection system 115, the control system 111 may be configured to ask an operator of the electric vehicle 103 to enter the location of the vehicle charge station 105 and to receive this information in response through a user interface.

The electric vehicle 103 may include a wireless communication system 117. The wireless communication system 117 may be configured to wirelessly transmit the location of the electric vehicle 103, as determined by the location detection system 115. The wireless communication system 117 may be configured to do so under the control of the control system 111. The control system 111 may be configured to cause the wireless communication system 117 to transmit the location information upon detection by the charging detector 113 of the battery 101 being recharged by a vehicle charge station, such as by the vehicle charge station 105. The control system 111 may be configured to cause this transmission to take place automatically upon detection of the battery 101 being recharged, without the need for any operator intervention.

The wireless communication system 117 may be configured to communicate the location information to a database system which is configured to index electric vehicle charge stations. Such a database system, for example, may be part of a server or server cluster on the Internet.

The wireless communication system 117 may be of any type. For example, the wireless communication system may include a data communication system configured to wirelessly transmit data over the Internet. The wireless communication system 117 may be part of a Data Control Module (DCM) within the vehicle and used in connection with other systems on the electric vehicle 103, such as vehicle theft and/or crash reporting systems. The wireless communication system 117 may include a short-range wireless communication subsystem, such as Bluetooth, that may communicate with a smart cell phone provided by the vehicle operator and cause the smart cell phone to wirelessly communicate the location information as data over the Internet.

The wireless communication system 117 may be configured to communicate other information at the same or other time as the location information. For example, the wireless communication system 117 may be configured to transmit information that may facilitate a determination as to whether the vehicle charge station 105 is publicly accessible, such as information concerning the amount of charging current and/or voltage (as detected, for example, by the voltage detector 114) that is being delivered to the battery 101 by the vehicle charge station 105, the day and time of day during which the recharging is taking place, the length of time needed for the recharging, and/or information identifying the electric vehicle 103, such as its VIN number, license plate number, and/or the number of its electronic control module.

Figure 2:
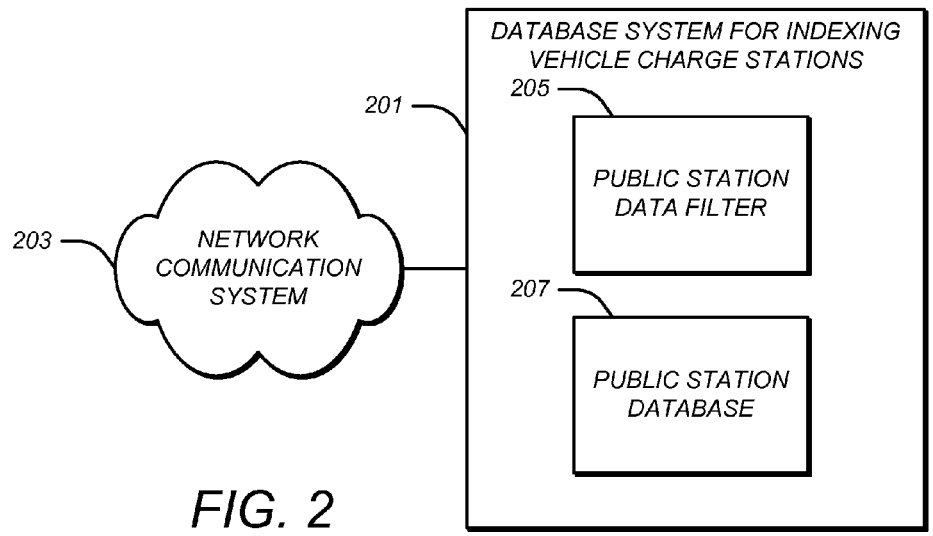
FIG. 2 illustrates an example of a database system for indexing electric vehicle charge stations that is connected to a network communication system.

FIG. 2 illustrates an example of a database system for indexing vehicle charge stations 201 that is connected to a network communication system 203.

The network communication system 203 may be of any type. For example, the network communication system may consist of or include a cellular network, the Internet, a local area network, a wide area network, a Bluetooth network, a WiFi network, a WiMax network, and/or any combination of these.

The database system for indexing charge stations 201 may be of any type. For example, the database system for indexing charge stations 201 may consist of or include a server or server cluster connected to the network communication system 203.

The database system for indexing charge stations 201 may be configured to receive charge station location information from each a plurality of electric vehicles which each transmit this information, such as from the electric vehicle 103 illustrated in FIG. 1. The database system for indexing charge stations 201 may be configured to receive any additional information which may be sent by each electric vehicle or other source, such as information concerning the amount of charging current and/or voltage that is being delivered to the battery by the vehicle charge station, the day and/or time of day during which the recharging is taking place, the length of time needed for the recharging, and/or information identifying the electric vehicle, all as discussed above in connection with FIG. 1.

The database system for indexing charge stations 201 may include a public station data filter 205. The public station data filter 205 may be configured to filter the information received by the database system for indexing charge stations 201 from electric vehicles and other sources to filter out and/or to tag locations which appear not to be publicly accessible. If the public station data filter 205 concludes that a vehicle charge station is publicly accessible, it may be configured to pass the location information, street address, and other information onto the public station database 207; otherwise, it may not pass on any of this information. It may instead be configured to pass on all information, regardless of whether the vehicle charge station is public, but to include a field of information indicating whether the vehicle charge station is publicly accessible or not.

The public station database 207 may be configured to receive, aggregate and store the information about the addresses of vehicle charge stations, including whether they are publicly accessible. The status of a vehicle charge station as being publicly accessible or not may come from the public station data filter 205.

The public station database 207 may be configured to receive information about the location of vehicle charge stations from sources other than vehicles. These other sources may include other databases of vehicle charge stations and/or individuals that manually provide such information, such as by issuing notices of new vehicle charge stations using social networks. The public station data filter 205 may similarly be configured to determine and report on whether these vehicle charge stations are publicly accessible, just as explained above in connection with vehicle-furnished information.

The information stored in the public station database 207 about the location of vehicle charge stations that are publicly accessible may be made available by the database system for indexing charge stations 201 to electric vehicle drivers and others in a variety of ways. For example, the database system for indexing charge stations 201 may be configured to make this information available at a searchable website. It may in addition or instead be made available through a smart phone application and/or a vehicle navigation service.

An electric vehicle may be equipped with a navigation system. For example, the electric vehicle 103 may be equipped with a navigation system 119, as illustrated in FIG. 1. The navigation system 119 may be configured to query the database system for indexing charge stations 201 for the location of vehicle charge stations which are publicly accessible and in the vicinity of the electric vehicle. The navigation system 119 may use the wireless communication system 117 for this purpose. The navigation system 119 may be configured to automatically issue such queries upon detection by a control system, such as the control system 111, that a battery, such as the battery 101, needs to be recharged in order for the vehicle to reach and/or return from a programmed destination. The navigation system 119 may be configured to select a charge station that is near or along a programmed route and to integrate a stop at this charge station into the navigation instructions which it provides to the driver.

Figure 3:
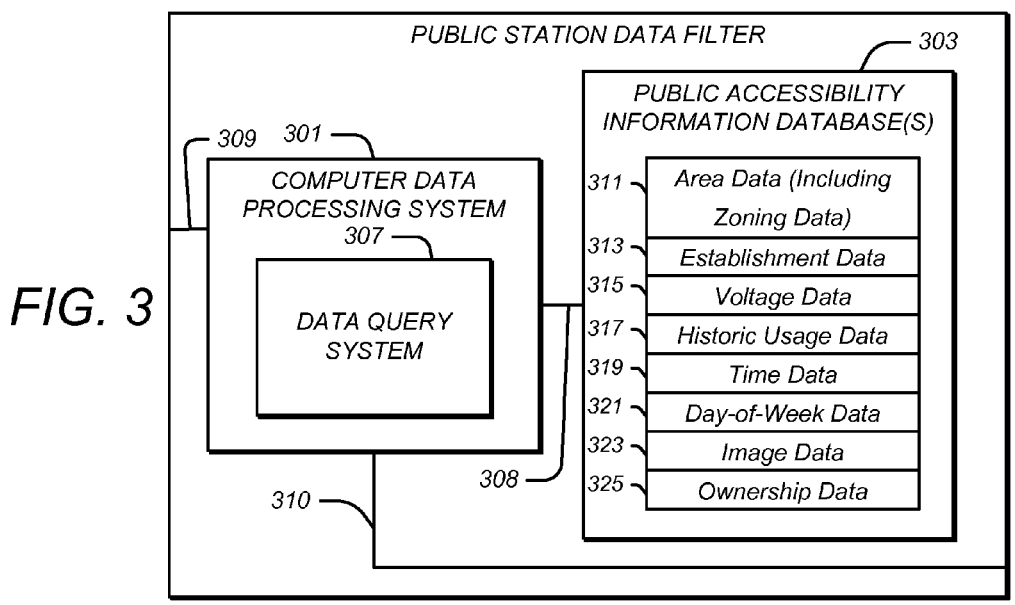
FIG. 3 illustrates an example of the public station data filter which is illustrated in FIG. 2 and which includes internal, public accessibility information database(s).

FIG. 3 illustrates an example of the public station data filter 205 which is illustrated in FIG. 2 and which includes internal public accessibility information database(s). The public station data filter 205 may be different from the one illustrated in FIG. 3, and the public station data filter illustrated in FIG. 3 may be used in connection with a database system for indexing charging stations which is different from the one illustrated in FIG. 2.

As illustrated in FIG. 3, the public station data filter may include a computer data processing system 301 and public accessibility information database(s) 303. The public station data filter may have a location data input 305 which is configured to receive location data which is indicative of the location of vehicle charge stations. As indicated above, this location data may come from wireless transmissions from one or more electric vehicles, such as the electric vehicle 103. This information may be communicated to the location data input 305 through any means, such as through the internet.

The public station data filter may include a public accessibility data input 308. The public accessibility data input 308 may be configured to receive accessibility data which is relevant to determining whether the vehicle charge station is publicly accessible. This may come from the public accessibility information database(s) 303 in response to a query for this information developed and sent by a data query system 307.

The computer data processing system 301 may be configured to determine whether the vehicle charge station is publicly accessible based on the accessibility data. The computer data processing system 301 may be configured with appropriate software to implement any algorithm or algorithms configured to make this determination.

The public station data filter may have a data output 310 configured to deliver output data indicative of whether a vehicle charge station is publicly accessible, based on the determination of such public accessibility by the computer data processing system 301. The data output may be configured to be delivered this information into a network communication system, such as into the internet, in response to a query to the public station data filter for this information.

The computer data processing system 301 may be configured to receive queries for the identity and/or location of vehicle charge stations which are publicly accessible and are in the vicinity of a vehicle at a location specified in the query. The computer data processing system 301 in conjunction with the data query system 307 may be configured to determine the location of these public and nearby vehicle charge stations and to return this information to the data output 309. The computer data processing system 301 may include tables or other data which maps geographic coordinates, such as longitude and latitude, to a street address as part of this process.

The public accessibility information database(s) 303 may contain any type of accessibility data which is relevant to determining whether a vehicle charge station is publicly accessible or is likely to be publicly accessible.

For example, the public accessibility information database(s) 303 may include area data (which may include zoning data) 311 which may be indicative of whether the vehicle charge station is in a residential, commercial, or industrial area. The computer data processing system 301 may be configured to determine whether a particular vehicle charge station is accessible based at least in part on this area data. For example, if the area data indicates that a vehicle charge station is in a residential area, the computer data processing system 301 may conclude that the vehicle charge station is not publicly accessible, because publicly accessible vehicle charge stations are not usually located within a residential area. Similarly, the computer data processing system 301 may conclude that a vehicle charge station that is within an industrial area is not publicly accessible because vehicle charge stations within industrial areas are usually managed by companies for use only by their employees. On the other hand, the computer data processing system 301 may be configured to deem a vehicle charge station which is located in a commercial area to be publicly accessible, because commercial areas may be the primary areas in which publicly accessible vehicle charge stations are located.

The area data (including zoning data) may come from any source. For example, the area data (including zoning data) may come from public records, such as public zoning records.

The public accessibility information database(s) 303 may include establishment data 313 which is indicative of whether a vehicle charge station is near or part of a commercial, industrial, or residential building. The computer data processing system 301 may be configured to give weight to this information in the same way as discussed above in connection with the area data 311, i.e., favoring a public-accessibility determination for vehicle charge stations which are near or part of a commercial building, but not vehicle charge stations which are near or part of an industrial or residential building.

The establishment data may come from any source, such as from telephone, business, public facility, and/or industry directories.

As part of the analysis process, the public station data filter 205 may be configured to translate the location information which it receives into a street address, such as by sending a query over the network communication system 203 to a reverse geo-coding database for this street address.

The public accessibility information database(s) 303 may include voltage data 315. The voltage data 315 may be indicative of the voltage which a particular vehicle charge station applies to a battery when it is being charged. This information may come, for example, from a vehicle while it is being charged, such as from the voltage detector 114 in FIG. 1, as described above. The computer data processing system 301 may be configured to determine whether the vehicle charge station is publicly accessible based at least in part on the voltage data 315. If the voltage data 315 indicates that the vehicle charge station charged a battery at a low voltage (e.g., 110 VAC), for example, the computer data processing system 301 may be configured to conclude that the vehicle charge station is not of a commercial grade, but is a home version. The computer data processing system 301 may therefore conclude that this vehicle charge station is not publicly accessible. Conversely, if the voltage data 315 indicates that the charge is at a high voltage (e.g., 230 VAC), this may indicate that the vehicle charge station is of a commercial grade and hence is likely to be publicly accessible. The computer data processing system 301 may therefore determine that a vehicle charge station which is charging at a high voltage is publicly accessible.

The public accessibility information database(s) 303 may include historic usage data 317. The historic usage data may be indicative of when the vehicle was charged by the vehicle charge station on different occasions. If the historic usage data indicates that the same vehicle was charged by the vehicle charge station at the same time and day each week, this may indicate that the vehicle charge station was being visited by someone who was regularly going to or coming from work, i.e., that the vehicle charge station is publicly accessible. Conversely, if the historic usage data 317 indicates that the vehicle visited the same vehicle charge station on different days of the week, or at different times of day, this may indicate that the vehicle charge station is a home machine which is being used on a more erratic basis do to the irregular nature of what a vehicle owner typically does when not on a working schedule, i.e., not publicly accessible.

The public accessibility information database(s) 303 may include time data 319. The time data may be indicative of the time of day at which the vehicle charge station delivered charge to a particular vehicle. If the time coincides to when people normally go to or return from work, this may be indicative of the vehicle charge station being publicly accessible. Conversely, if the time is in the middle of the day or very late at night, this may be indicative of the vehicle being charged at home, i.e., that the vehicle charge station is not publicly accessible.

The public accessibility information database(s) 303 may include day-of-week data 321. The day-of-week data 321 may be indicative of a day of a week in which the vehicle charge station delivered charge to a particular vehicle. If the delivery is on weekdays, for example, this may indicate that the vehicle is being charged while traveling to or from work, i.e., that the vehicle charge station is publicly accessible. Conversely, if the day-of-week data indicates that the vehicle is being charged on weekends, this may indicate that the vehicle charge station is not being used in connection with business travel, i.e., that it is a home station which is not publicly accessible.

The public accessibility information database(s) 303 may include image data 323. The image data 323 may be indicative of at least one image of the vehicle charge station. A study of this image may provide information indicative of whether the vehicle charge station is publicly accessible. For example, an image of a vehicle charge station may reveal that the station is within a home garage, suggesting that the station is not publicly accessible. Conversely, the image data 323 may indicate that the vehicle charge station is one of many in a row and/or that it is not surrounded by any structure, information which may be indicative of the vehicle charge station being publicly accessible. The analysis of the image data 323 may be done manually and/or automatically using image recognition technology.

The public accessibility information database(s) 303 may include ownership data 325. The ownership data may be indicative of the address of vehicle owners. As indicated above, an electric vehicle, such as the electric vehicle 103 may automatically report not only the location of the vehicle charge station, but information identifying the vehicle which is being charged, such as its VIN and/or license plate number. The ownership data 325 may include Department of Motor Vehicle data which maps vehicle VIN and/or license plate numbers to owner addresses. If the address of the owner and the reported address of the vehicle charge station are the same, this may indicate that the vehicle charge station is operating at the residence of the vehicle owner, i.e., that it is not publicly accessible.

The public accessibility information database(s) 303 may include additional or different types of data which are indicative of whether a particular vehicle charge station is publicly accessible.

The computer data processing system 301 may be configured to assign different weights to the various types of pubic accessibility data which are retrieved from the public accessibility information database(s) 303 by the data query system 307 as part of the process of determining whether a particular vehicle charge station is publicly accessible. For example, a match between the location of the vehicle charge station and the residence of the owner of a vehicle which reported this location may be given more weight than the voltage data 315 which indicates that the charging was at a high voltage (e.g., 220 VAC) level and/or time data 319 and day-of-week data 321 which indicate that the vehicle is regularly being charged at 9:00 am every Monday.

Figure 4:
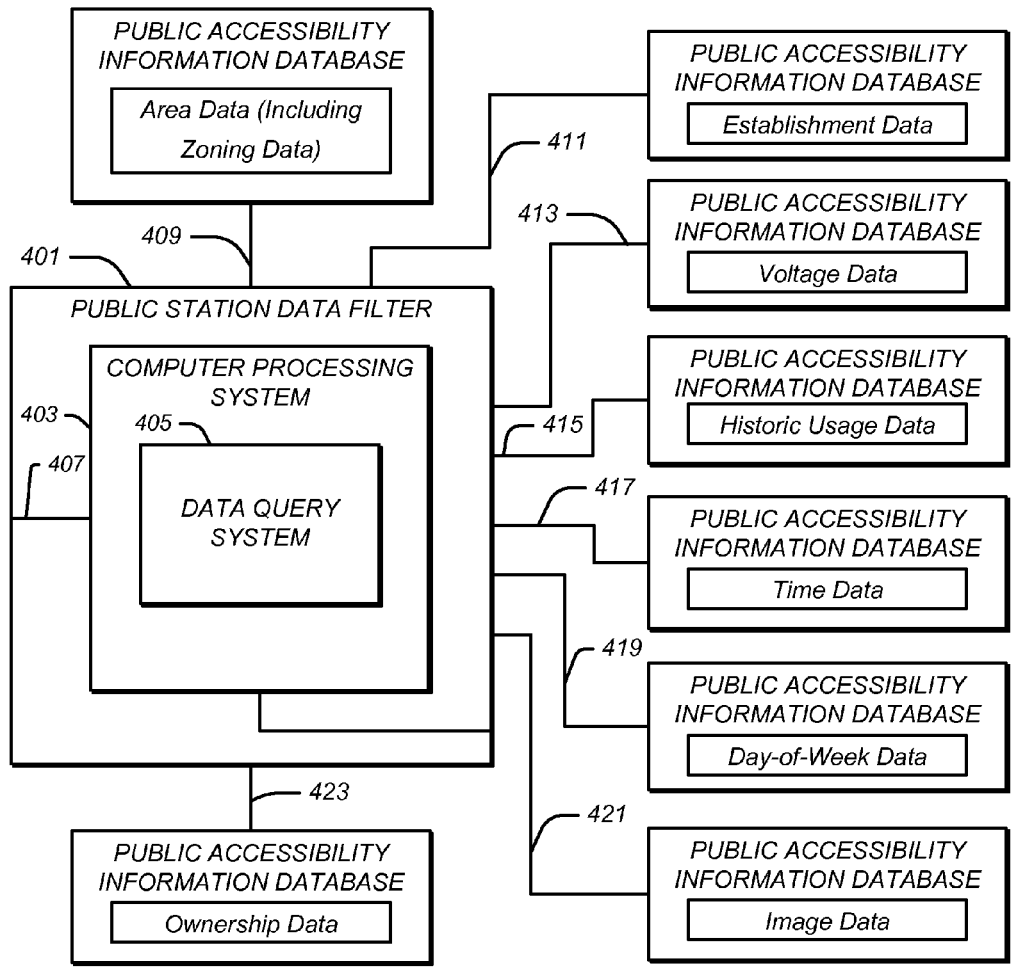
FIG. 4 illustrates another example of the public station data filter which is illustrated in FIG. 2 and which uses external public accessibility information database(s).

FIG. 4 illustrates another example of the public station data filter 205 which is illustrated in FIG. 2 and which uses external public accessibility information database(s). The public station data filter 205 which is illustrated in FIG. 2 may be different from the one which is illustrated in FIG. 4. Similarly, the public station data filter 401 which is illustrated in FIG. 4 may be used in connection with database systems for indexing charging stations which are different from the one illustrated in FIG. 3.

The public station data filter 401 which is illustrated in FIG. 4 may include a computer processing system 403, a data query system 405, a location data input 407, and public accessibility data inputs 409, 411, 413, 415, 417, 419, 421, and 423. The components illustrated in FIG. 4 may be identical to the components which are illustrated in FIG. 3 with the same name, except that the public accessibility information database(s) may all be external to the public station data filter 401. As also illustrated in FIG. 4, each of the external public accessibility information databases may be separate from the other public accessibility information databases. The external databases may be maintained by public and/or private entities. The data query system 405 may be configured to query the appropriate public accessibility information database for the accessibility data which is needed. In still other configurations, some of the public accessibility information database(s) may be internal to the public station data filter, as illustrated in FIG. 3, while others may be external, as illustrated in FIG. 4.

Figure 5:
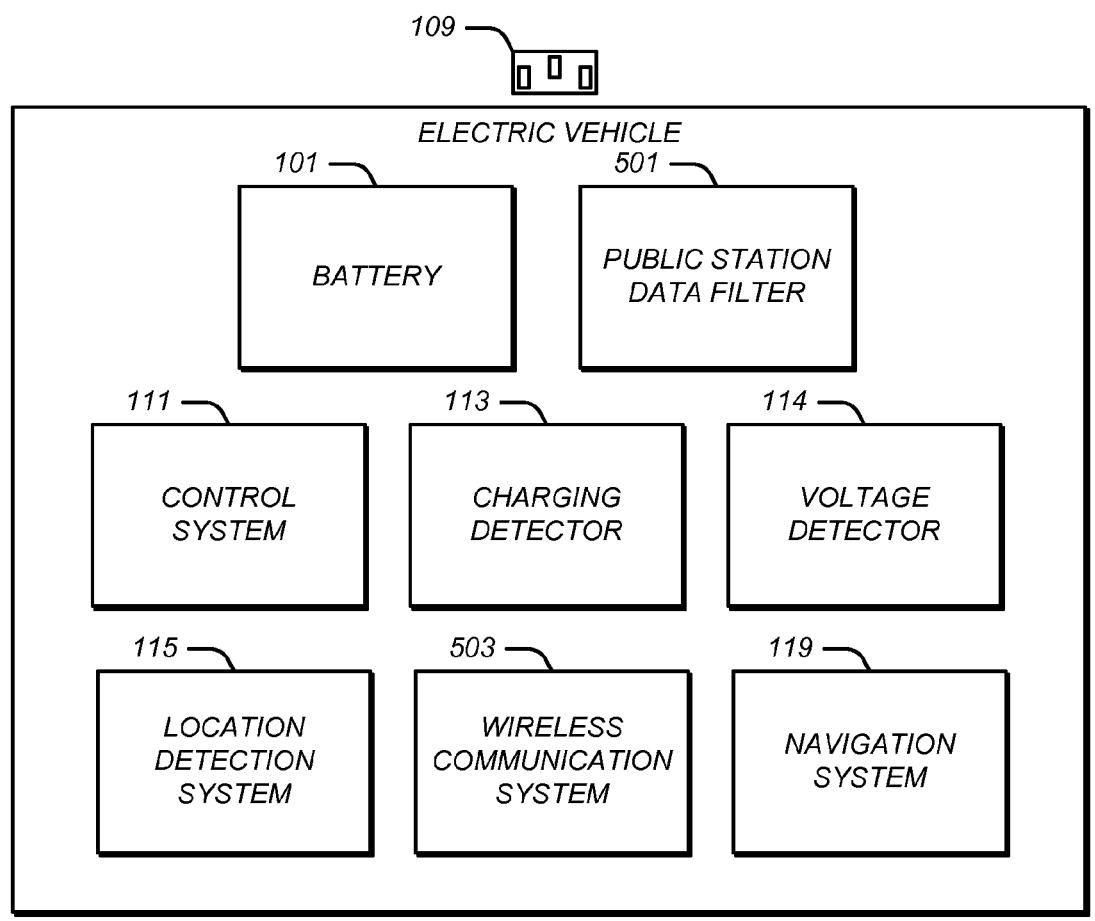
FIG. 5 illustrates another example of an electric vehicle which may be charged at an electric vehicle charge station.

FIG. 5 illustrates another example of an electric vehicle which may be charged at an electric vehicle charge station. The electric vehicle which is illustrated in FIG. 5 may be the same as the electric vehicle 103 which is illustrated in FIG. 1 and discussed above, except that the electric vehicle which is illustrated in FIG. 5 may additionally contain a public station data filter 501.

The public station data filter 501 may be the same as the public station data filters illustrated in FIG. 3 or 4, i.e., it may be configured to determine whether the vehicle charge station which is currently charging the electric vehicle is publicly accessible based on accessibility data. The accessibility data may be the same as or different from that which is discussed above in connection with FIG. 3 or FIG. 4. A user of the electric vehicle may also manually input whether the vehicle charge station is publicly accessible.

The electric vehicle illustrated in FIG. 5 may have a wireless communication system 503 which is the same as the wireless communication system 117 illustrated in FIG. 1. However, the wireless communication system 503 which is illustrated in FIG. 5 may be configured not to transmit the location of a vehicle charge station which is charging the vehicle, if the public station data filter 501 determines that the vehicle charge station is not publicly accessible. Alternatively, the wireless communication system 503 may be configured to transmit the location of all vehicle charge stations, along with the determination by the public station data filter 501 as to whether the vehicle charge station is publicly accessible.

Non-transitory, tangible computer-readable media may contain a program of computer-readable instructions which, when executed by a computer system, cause the computer system to perform the operations described above in connection with the database system for indexing charge stations 201 which is illustrated in FIG. 2 and/or the public station data filter 501 and the wireless communication system 503 which is illustrated in FIG. 5, all as discussed above. The program of computer-readable instructions may in addition or instead cause the computer system to perform one or more functions of the control system 111, the charging detector 113, the voltage detector 114, the location detection system 115, and/or the navigation system 119 illustrated in both FIG. 1 and FIG. 5. The instructions may implement one or more algorithms which are configured to cause these functions to be performed. Unless otherwise indicated, the control systems, charging detectors voltage detectors, location detection systems, wireless communication systems, navigation systems, and database systems for indexing vehicle charge stations which have been discussed herein may each be implemented with a computer system configured to perform the functions which have been described herein for the component. Each computer system may include one or more computers. In the case of the database systems for indexing vehicle charge stations, these computers may be at the same or different locations. When at different locations, the computers may be configured to communicate with one another through a wired and/or wireless network communication system. Each computer may include one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens). Each computer may be part of a larger system, such a vehicle, appliance, and/or telephone system. Each computer may include software (e.g., one or more operating systems, device drivers, application programs, and/or communication programs), which may be configured when executed to cause the computer to perform one or more of the functions which have been described herein for the computer system. The software may include programming instructions and associated data and libraries. The software may implement one or more algorithms which may cause the computer to perform each function. The software may be stored on one or more tangible storage devices, such as one or more hard disk drives, CDs, DVDs, and/or flash memories. The software may be in source code and/or object code format. Associated data may be stored in any type of volatile and/or non-volatile memory.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are incorporated herein by reference. Except as stated immediately above, nothing which has been stated or illustrated is intended or should be interpreted to cause a dedication of any component, step, feature, object, benefit, advantage, or equivalent to the public, The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents. Notwithstanding, none of the claims are intended to embrace subject matter which fails to satisfy the requirement of Sections 101, 102, or 103 of the Patent Act, nor should they be interpreted in such a way. Any unintended embracement of such subject matter is hereby disclaimed. Except as stated immediately above, nothing which has been stated or illustrated is intended or should be interpreted to cause a dedication of any component, step, feature, object, benefit, advantage, or equivalent to the public, regardless of whether it is or is not recited in the claims.

The invention claimed is:

1. A system for automatically determining whether a vehicle charge station is publicly-accessible comprising:
   a location data input configured to receive location data which is indicative of the location of the vehicle charge station;
   a public accessibility data input configured to receive accessibility data which is relevant to determining whether the vehicle charge station is publicly accessible;
   a computer data processing system configured to determine whether the vehicle charge station is publicly accessible based on the accessibility data; and
   a data output configured to deliver output data indicative of whether the vehicle charge station is publicly accessible based on the determination of such public accessibility by the computer data processing system.

2. The system of claim 1 wherein:
   the accessibility data which is relevant to determining whether the vehicle charge station is publicly accessible includes area data indicative of whether the location of the vehicle charge station is in a residential, commercial, or industrial area; and
   the computer data processing system is configured to determine whether the vehicle charge station is publicly accessible based at least in part on the area data.

3. The system of claim 2 wherein area data includes zoning data.

4. The system of claim 2:
   further comprising a data query system configured to deliver a query to a database for the area data; and
   wherein the location data input is configured to receive the results of such a query.

5. The system of claim 1 wherein:
   the accessibility data which is relevant to determining whether the vehicle charge station is publicly accessible includes establishment data indicative of whether the location of the vehicle charge station is near or within a commercial, industrial or residential building; and
   the computer data processing system is configured to determine whether the vehicle charge station is publicly accessible based at least in part on the establishment data.

6. The claim 1:
   wherein the accessibility data which is relevant to determining whether the vehicle charge station is publicly accessible includes voltage data indicative of a voltage level of an electric charge delivered by the vehicle charge station to a vehicle; and
   the computer data processing system is configured to determine whether the vehicle charge station is publicly accessible based at least in part on the voltage data.

7. The system of claim 1:
   wherein the accessibility data which is relevant to determining whether the vehicle charge station is publicly accessible includes historic usage data indicative of when a vehicle was charged by the vehicle charge station on different occasions; and
   the computer data processing system is configured to determine whether the vehicle charge station is publicly accessible based at least in part on the historic usage data.

8. The system of claim 1:
   wherein the accessibility data which is relevant to determining whether the vehicle charge station is publicly accessible includes time data indicative of a time of day at which the vehicle charge station delivered a charge to a vehicle; and
   the computer data processing system is configured to determine whether the vehicle charge station is publicly accessible based at least in part on the time data.

9. The system of claim 1:
   wherein the accessibility data which is relevant to determining whether the vehicle charge station is publicly accessible includes day-of-week data indicative of the day of a week on which the vehicle charge station delivered a charge to a vehicle; and
   the computer data processing system is configured to determine whether the vehicle charge station is publicly accessible based at least in part on the day-of-week data.

10. The system of claim 1:
    wherein the accessibility data which is relevant to determining whether the vehicle charge station is publicly accessible includes image data indicative of at least one image of the vehicle charge station; and the computer data processing system is configured to determine whether the vehicle charge station is publicly accessible based at least in part on the image data.

11. The system of claim 1:

wherein the location data is provided by a vehicle;

the accessibility data which is relevant to determining whether the vehicle charge station is publicly accessible includes ownership data indicative of the address of the owner of the vehicle; and the computer data processing system is configured to determine whether the vehicle charge station is publicly accessible based at least in part on the ownership data.

12. The system of claim 1 further comprising:

a vehicle containing the location data input, the public accessibility data input, the computer data processing system, and the data output; and a location detection system within the vehicle configured to detect the location of the vehicle and to provide this detected vehicle location to the location data input as the location data which is indicative of the location of the vehicle charge station when the vehicle is being charged by the vehicle charge station.

13. The system of claim 12 further comprising a wireless communication system in the vehicle configured to wirelessly transmit the location data which is indicative of the location of the vehicle charge station to a database system for indexing charge stations which is configured to aggregate location data from multiple vehicles.

14. The system of claim 13 wherein the wireless communication system is configured to wirelessly transmit the location data to the database system for indexing charge stations if and only if the output data indicates that the vehicle charge station is publicly accessible.

15. The system of claim 13 wherein the wireless communication system is configured to wirelessly transmit the output data indicative of whether the vehicle charge station is publicly accessible to the database system for indexing charge stations.

16. The system of claim 12:

further comprising a voltage detector in the vehicle configured to measure the voltage of a charge delivered to the vehicle by the vehicle charge station; and wherein the accessibility data which is relevant to determining whether the vehicle charge station is publicly accessible includes the voltage measured by the voltage detector.

17. The system of claim 1:

further comprising a database system for indexing charge stations containing the location data input, the public accessibility data input, the computer data processing system, and the data output; and wherein the location data input is configured to receive location data indicative of the location of vehicle charge stations from multiple vehicles.

18. The system of claim 17 wherein the database system for indexing charge stations is configured to receive multiple queries, each seeking the location of at least one publicly accessible vehicle charge station which is near a location which is part of the query and, in response to each query, provide the at least one location.

19. The system of claim 17 wherein the database system for indexing charge stations is configured to distinguish between vehicle charge stations which have been determined to be publicly accessible and vehicle charge stations which have been determined not to be publicly accessible by the computer data processing system.

20. Non-transitory, tangible computer-readable media containing a program of computer-readable instructions which, when executed by a computer system, causes the computer system to determine whether a vehicle charge station is publicly accessible, by:

receiving location data which is indicative of the location of the vehicle charge station;

receiving accessibility data which is relevant to determining whether the vehicle charge station is publicly accessible;

determining whether the vehicle charge station is publicly accessible based on the accessibility data; and delivering output data indicative of whether the vehicle charge station is publicly accessible based on a determination of such public accessibility by the computer data processing system.

* * * * *